M. MARTIN.
FLUID GAGE.
APPLICATION FILED JULY 30, 1909.
1,003,404.
Patented Sept. 12, 1911.
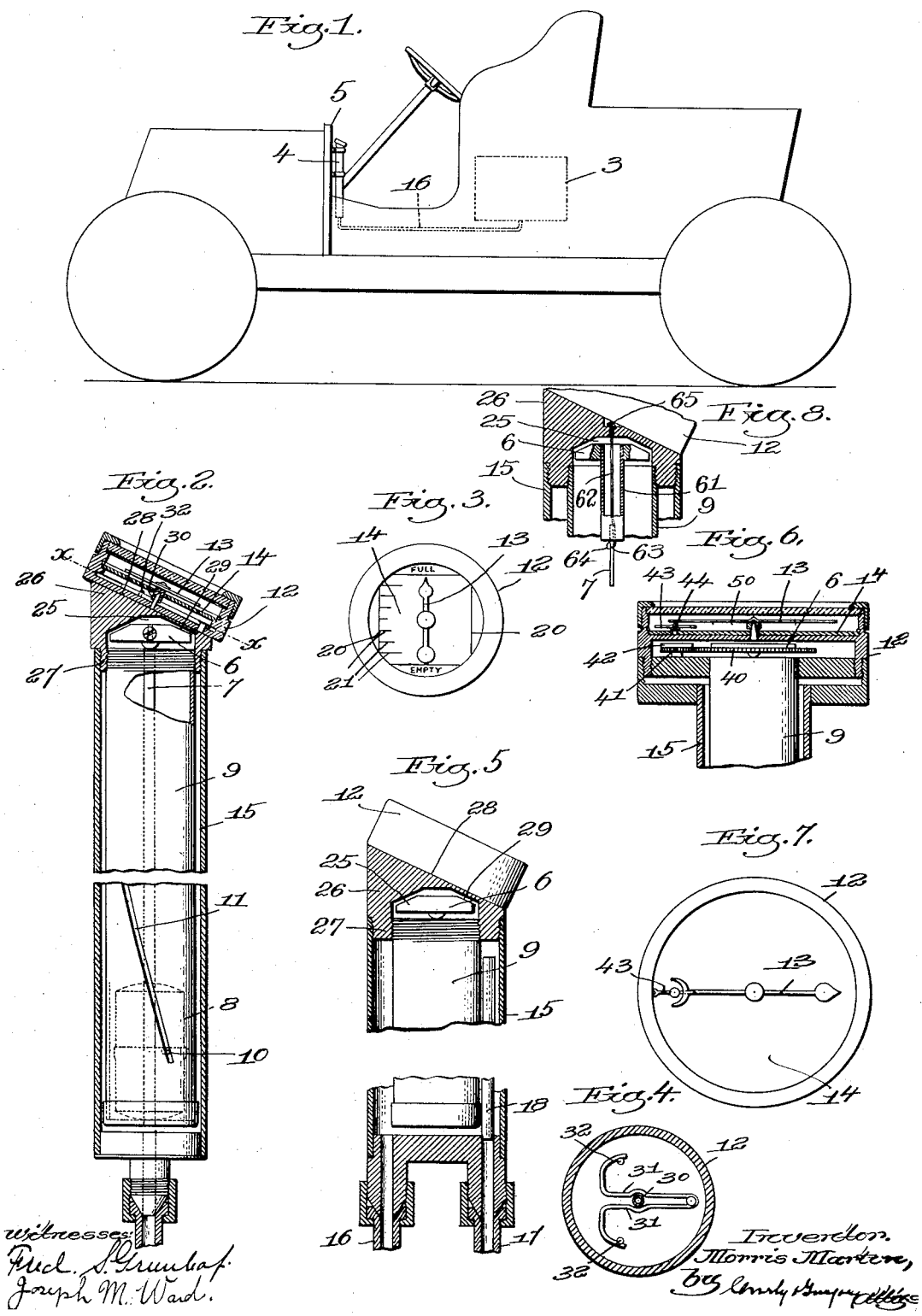

UNITED STATES PATENT OFFICE.

MORRIS MARTIN, OF MALDEN, MASSACHUSETTS.

FLUID-GAGE.

1,003,404.  Specification of Letters Patent.  Patented Sept. 12, 1911.

Application filed July 30, 1909. Serial No. 510,429.

*To all whom it may concern:*

Be it known that I, MORRIS MARTIN, a citizen of the United States, residing at Malden, county of Middlesex, and State of Massachusetts, have invented an Improvement in Fluid-Gages, of which the following description, in connection with the accompanying drawing, is a specification, like letters on the drawing representing like parts.

This invention relates to that type of fluid gage for indicating the fluid level in a tank in which the indication is made by a magnetic needle, the position of which is controlled by a magnet that in turn has its position controlled by a float. A fluid gage of this type is shown in my Patents No. 794,675 and No. 794,676, dated July 12, 1905. In these patents, however, the fluid gage is associated directly with the tank containing the liquid the level of which is to be indicated.

My present invention aims to provide a novel fluid gage of the above-described character which can be located at a point remote from the tank and which will at all times indicate the level of the liquid in the tank. While a fluid gage embodying my invention is capable for use in a variety of locations, it is especially applicable for use in connection with automobiles for indicating the level of the gasolene in the gasolene tank because it is possible with my invention to place the indicator or gage on the dasher or in some other position where it can be readily seen by the occupant of a car, while the gasolene tank itself may be under the seat or in any other convenient location.

My invention also aims to provide a novel construction of head for the gage, by means of which the dial and the indicating needle may be placed at an angle to the axis of the float shaft, thus making a gage which can be more readily read than if the dial stood in a horizontal plane.

My invention also aims to provide a novel construction whereby slight differences in level of fluid in the tank can be readily read on the indicator, and to otherwise improve the gage in features which will be more fully hereinafter described and then pointed out in the appended claims.

In the drawings wherein I have illustrated some embodiments of my invention, Figure 1 is a side view of an automobile showing my improved gage applied to the dasher; Fig. 2 is a vertical section through a gage embodying my invention; Fig. 3 is a top plan view of the gage head; Fig. 4 is a section on the line $x$—$x$, Fig. 2; Fig. 5 is a detail of a modified form of gage; Fig. 6 is a vertical section through a head showing a gage of that type which is adapted to indicate small variations in fluid level; Fig. 7 is a plan view of the head shown in Fig. 6. Fig. 8 is a detail view showing a different manner of suspending the float shaft.

In the automobile shown in Fig. 1, 3 indicates the gasolene tank, it being situated under the seat. The gage for indicating the level of gasolene in said tank is designated generally by 4. It is shown as placed on the dasher 5 in a position where it may be readily read by an occupant of the car. As stated above, the gage is of that type shown in my Patents No. 794,675 and No. 794,676, both dated July 12, 1905, in which a float controlled by variations in liquid level is used to actuate a shaft sustaining a magnet which controls the position of a magnetic needle constituting the indicating finger. The magnet of the gage is shown at 6 and it is sustained by a ribbon shaft 7 which extends through a float 8 that is received in a tube 9 provided with a spiral slot 11, said float having arms 10 extending therefrom which play in said slot 11. As the float rises and falls, the shaft, and consequently the magnet 6, will be turned, as will be clearly understood. The gage is also provided with a head 12 in which is pivoted a pointer or indicator 13 that plays over a dial 14, said indicator 13 being in the form of a magnetic needle which will be attracted by and follow the position of the magnet 6, as will be clear by reference to said patents. In order to make a gage of this type capable of use as a dasher gage, I inclose the spirally-slotted tube 9 in a casing 15 which forms a closed chamber and I establish a communication between the casing 15 and the tank 3, so that the level of the liquid will be the same in both the tank and the casing 15. The gage should be placed on the dasher in such a position that the upper edge of the spirally-slotted tube 9 will be on a level with the top of the tank 3, and said tube should be long enough so that the lower end thereof will come on a level with the bottom of the tank, as clearly seen in Fig. 1. The position of the float 8 and consequently the position of the pointer or needle 13 is controlled by the level of the liquid in the casing 15, and as the liquid level in said casing is always the same as that in the tank 3, the gage will, when set up as shown in Fig. 1, properly indicate the level of the liquid in the tank 3.

The communication between the casing 15 and the tank 3 may be provided for in a variety of ways. Where the tank is not under pressure, it is sufficient to connect the bottom of the casing 15 with the bottom of the tank by a pipe or conduit 16. If, however, the tank is under pressure, then it would be necessary to provide for equalizing the pressure in the casing 15 and in the tank, and I propose to accomplish this by forming a double connection between the casing 15 and the tank, as shown in Fig. 5. The pipe 16 will connect the bottom of the casing 15 with the bottom of the tank and another pipe 17 will communicate with the top of the tank 3 and will communicate also with a pipe 18 which extends up in the casing 15 to the top thereof. The pipes 17, 18 serve to equalize the air pressure between the casing and the tank, as will be obvious.

In my improved gage I have so marked the dial 14 that the pointer 13 will not only indicate the depth of gasolene in the tank, but will also present to the observer what practically amounts to a reproduction of the shape of the tank so that the observer may see for himself the relation between the body of gasolene in the tank and the size of the tank. I accomplish this by placing on the dial a geometrical figure similar to the vertical cross-sectional shape of the tank, said figure having such a position relative to the pointer or needle 13 that the position of the needle will not only indicate whether the tank is one-half full, three quarters full, etc., but will also indicate the relative position of the fluid level to the bottom of the tank. In the drawings herein shown the tank is substantially square in cross section and the dial 14 has thereon lines 20 which are arranged to constitute a square. One of the lines representing the vertical side of the tank is provided with graduation marks 21. When the pointer 13 points to any one of the graduation marks, this indicates that the fluid level has the same relation to the bottom of the tank 3 that said indication mark has to the lower side of the square 20. If the tank is circular in cross section, then a circle will be formed on the dial, or if the tank has any other cross sectional shape, a geometrical figure having a smaller shape will be formed on the dial. In any case, this construction not only indicates to the observer the depth of the gasolene in the tank, but also enables him to compute the relative amount of gasolene.

Where the gage is placed on the dasher, as above described, it can be more readily read if the dial is inclined slightly rather than placed in a horizontal position. In Fig. 2 I have shown how this may be done without disturbing the proper operative relation between the needle 13 and the magnet 6. In the embodiment shown in Fig. 2, the magnet 6 is received within a chamber 25 formed in a block 26, said block having the annular flange 27 to which the tube 9 and casing 16 are screw-threaded. The upper surface 28 of this block is inclined and the head 12 sets on this upper surface. The magnet 6 is provided with the beveled end 29 which stands substantially parallel with the dial 14 or the magnetic needle 13. The strength of the magnet is such that the needle 13 will follow the position of the magnet even though said needle operates about an axis situated at an angle to the axis of the magnet. The head 12 is preferably made detachable from the block 26 and means are provided for locking the needle from rotation automatically when the head is removed. The means employed for this purpose may be the same as is shown and described in my Patent Number 903,213, dated November 10, 1908. The needle 13 is provided with a hub 30 which is normally situated between two spring arms 31. These arms normally engage the hub and hold the needle from rotation. When, however, the head is applied to the block 26, a pin or pins 32 extending from said block engage the spring arms and disengage them from the hub, thus permitting the pointer to rotate freely.

It is sometimes desirable to be able to note very small changes in fluid level in the tank 3, but where the pointer only makes a half revolution between the full and the empty positions, a slight change in level will change the position of the pointer so slightly that it would be very difficult to detect it. In Figs. 6 and 7 I have shown a form of head for a gage in which very slight variations in the liquid level may be easily detected. In this embodiment of my invention the magnet 6 has rigid therewith a gear wheel 40 which meshes with a smaller gear wheel 41 that carries a magnet 42. The magnet 7 operates the pointer or magnetic needle 13 in usual manner. Situated above the magnet 42 is a smaller magnetic needle 43, said needle being mounted on a suitable pivot 44. Owing to the fact that the pinion 41 is very much smaller than the pinion 40, a slight turning movement of the gear 40 will turn the gear 41 through a considerable angle. The magnetic needle 43 varies the position of the magnet 42 and therefore any slight turning of the gear 40 and magnet 7 will be indicated by the turning of the magnetic needle 43 through a considerable angle. The relation between the magnetic needle 43 and the magnetic needle 13 is somewhat analogous to that between the minute and the second hands of a watch, although, of course, the gearing connecting the magnets is timed very differently from that connecting the minute and second hands of a watch. In order that the magnetic needles may not interfere with the operation of each other, I prefer to make the long magnetic needle 13 with its central portion only of magnetizable material, as shown at 50, such central portion being only substantially as long as the magnet 7. The extremities of the needle 13 may be made of any known non-magnetic material which will not influence in any way the needle 43.

The ribbon shaft 7 may be suspended in a variety of ways without departing from the invention, although under some conditions I prefer the manner of suspending it shown in Fig. 8. In this embodiment, said ribbon shaft has secured thereto at its upper end a short length of tubing 61 on the upper end of which is mounted a magnet 6. The shaft is suspended by means of a cord 62 preferably of silk which extends down through the tube 61 and the lower end of which extends through an opening 63 formed in the ribbon shaft and is provided with a knot 64 to prevent it being pulled through said opening. The upper end of the cord extends through an opening in the block 26 which is shown in Fig. 8, or through an opening in the plate at the upper end of the tube 9, and said upper end of the cord is provided with a knot 65 by which the cord is sustained. This construction makes a very flexible suspension for the shaft which permits the shaft to turn freely and without friction.

Having fully described my invention, what I claim as new and desire to secure by Letters Patent is:—

1. In a gage, the combination with a casing, of a spirally slotted tube inclosed within the casing, a shaft or support within the tube, a float movable longitudinally of the shaft but held from rotation relative thereto and provided with a laterally-extended pin which plays in said slot, a pointer, and means to operate the latter by the turning movement of the shaft.

2. In a gage, the combination with a head block, of a casing secured thereto, means to connect said casing with the tank having the liquid therein the level of which is to be indicated, a spirally-slotted tube also secured to said head block and situated within said casing, a float within said tube and guided by the slot therein, a pointer sustained by the head block, and means to operate the pointer by the turning of the float caused by the rising and falling movement thereof.

3. In a gage, the combination with a magnet, of a shaft sustaining said magnet, a float, means to turn the shaft by the rising and falling movement of the float, a magnetic needle controlled as to its position by the magnet, and means to sustain said needle with its axis at an angle to the axis of the magnet.

4. In a gage, the combination with a head block, of a tube depending therefrom, a shaft within said tube, a magnet sustained by the shaft, a float within the tube, means coöperating with the tube to turn the shaft by the rising and falling movement of the float, said block having an inclined upper face, a gage head sustained by said face, and a magnetic needle journaled in said head with its axis at an angle to the axis of the magnet.

5. In a fluid gage, the combination with a spirally-slotted tube, of a float shaft within said tube, a float movable longitudinally of said shaft and provided with an arm extending into the slot in the tube, and a cord for pivotally suspending said shaft from the upper end of the tube.

6. In a fluid gage, the combination with a spirally-slotted tube, of a float shaft within said tube, a float movable longitudinally of said shaft and provided with an arm extending into the slot in the tube, a tube secured to the upper end of said shaft, a magnet carried by said tube, and a cord secured to said shaft and extending through said tube and by which the shaft is pivotally suspended.

7. In a gage, the combination with a head block having an annular flange on its under side, of a casing secured to the exterior of said flange, means to connect said casing to a tank, a spirally-slotted tube secured to the interior of said flange, a float within said tube provided with a pin to enter the slot of the tube, a pointer carried by the head block, and means to operate the pointer by the turning of the float caused by the rising and falling movement thereof.

8. In a gage, the combination with a casing provided with means for connection to a tank, of a float within the casing, a pointer sustained by the casing, means to operate the pointer by movement of the float, and a dial coöperating with the pointer, said dial having thereon an outline figure of the same shape as the vertical cross sectional shape of the tank to which the gage is to be connected, which figure is so situated that the pointer will indicate thereon the depth of the liquid in the tank.

In testimony whereof, I have signed my name to this specification, in the presence of two subscribing witnesses.

MORRIS MARTIN.

Witnesses:
Louis C. Smith,
Thomas J. Drummond.